United States Patent [19]

Yang et al.

[11] Patent Number: 5,606,395
[45] Date of Patent: Feb. 25, 1997

[54] METHOD AND APPARATUS FOR ADJUSTING MACHINE PARAMETERS IN A PRINTING MACHINE TO PROVIDE REAL-TIME PRINT APPEARANCE CONTROL

[75] Inventors: Eugene L. Yang; Randolph Parks, both of Fairport, N.Y.

[73] Assignee: Xerox Corporation, Stamford, Conn.

[21] Appl. No.: 583,827

[22] Filed: Jan. 11, 1996

[51] Int. Cl.⁶ .................................................. G03G 15/36
[52] U.S. Cl. ............................ 399/81; 395/792; 358/452
[58] Field of Search .................................. 355/208, 209, 355/204, 203; 395/146, 147, 148; 358/452, 448, 462

[56] References Cited

U.S. PATENT DOCUMENTS

| | | | |
|---|---|---|---|
| 4,348,099 | 9/1982 | Fantozzi | 355/14 E |
| 4,740,814 | 4/1988 | Folkins | 355/7 |
| 5,006,892 | 4/1991 | Roehrs et al. | 355/208 |
| 5,081,491 | 1/1992 | Lux et al. | 355/208 |
| 5,081,492 | 1/1992 | Hammond | 355/208 |
| 5,122,842 | 6/1992 | Rimai et al. | 355/326 |
| 5,132,730 | 7/1992 | Hurwitch et al. | 355/206 |
| 5,138,378 | 8/1992 | MacDonald et al. | 355/208 |
| 5,157,441 | 10/1992 | Scheuer et al. | 355/208 |
| 5,223,897 | 6/1993 | MacDonald et al. | 355/208 |
| 5,225,873 | 7/1993 | Lux et al. | 355/208 |
| 5,227,270 | 7/1993 | Scheuer et al. | 430/31 |
| 5,285,241 | 2/1994 | Scheuer | 355/208 |
| 5,383,027 | 1/1995 | Harvey et al. | 395/146 X |
| 5,388,195 | 2/1995 | Aoyama | 395/146 |
| 5,416,564 | 5/1995 | Thompson et al. | 355/208 |
| 5,436,705 | 7/1995 | Raj | 355/246 |
| 5,454,072 | 9/1995 | Aoyama | 395/146 |
| 5,546,165 | 8/1996 | Rushing et al. | 355/208 |
| 5,548,414 | 8/1996 | Sugano et al. | 358/452 |

*Primary Examiner*—R. L. Moses
*Attorney, Agent, or Firm*—Duane C. Basch

[57] ABSTRACT

A digital color printing system having an input device such as a joystick is disclosed that provides real-time print quality control during a print run. The joystick is located near an output tray to enable an operator to perceive adjustments to print quality in real-time. The joystick modifies nominal electrostatic control points stored in non-volatile memory (NVM) of the printing system. Long term process controls are unchanged by joystick input, while short-term xerographic process controls are overridden by joystick commands. In one embodiment, joystick controls are used to adjust electrostatic controls which include adjusting developer bias and transfer current. In another embodiment, joystick controls also adjust, image processing parameters such as TRC curves. The new image processing parameters require that a contone image originally processed must be reprocessed to form a new raster image.

16 Claims, 9 Drawing Sheets

METHOD AND APPARATUS FOR ADJUSTING MACHINE PARAMETERS IN A PRINTING MACHINE TO PROVIDE REAL-TIME PRINT APPEARANCE CONTROL

The present invention relates to process control in a digital printing system, and in particular to manipulation of xerographic process and image processing control setpoints to provide real-time control over print appearance.

BACKGROUND AND SUMMARY OF THE INVENTION

In general, electrostatographic printing machines have control systems that insure print appearance throughout the operating life of a machine. Xerographic process control systems are typically embedded systems with interactive feedback loops that are absent operator adjustments. These embedded control systems compensate for photoreceptor dark decay, laser or flash lamp aging, etc. In addition, embedded control systems are self-adjusting so as to insure that print engine settings are invariant from one system to another. The invariant nature of the print or process control settings insures consistent image quality from one machine to another. This lack of operator control over image quality during print runs insures that systems operate within a preset operating range. Color printing systems with stringent image quality requirements have xerographic subsystems that are sensitive to use as well as environmental changes.

Xerographic process feedback control systems are well known. Such feedback systems include systems for charging control, exposure and illumination control, developer control, toner dispensing control, etc. For example, U.S. Pat. No. 4,348,099 discloses the use of test patches, an infrared densitometer, and an electrometer for charge, illumination, toner dispenser, and developer bias control. Other examples of feedback control systems are disclosed in U.S. Pat. Nos. 5,416,564; 5,006,892; 5,225,837; 4,348,099; 5,081,491; and 5,081,492. A further example of process control is U.S. Pat. No. 5,132,730 which discloses a single pass, tri-level, printing machine with a first electrostatic voltmeter (ESV) that reads the voltage level of a color image prior to development and a second ESV after development. The difference between these two readings is compared to an arbitrary target value and a machine cycle down is initiated if the difference is greater than the target. Other process control systems using two ESVs are disclosed in U.S. Pat. Nos. 5,138,378; 5,157,441; 5,223,897; 5,227,270; 5,132,730 and 5,285,241. Process controls, which are for example present in the 5775 Digital Color Copier manufactured by the Xerox® Corporation, are necessary to maintain stringent image quality or print appearance requirements.

In contrast, lithography or offset printing offer greater control over image quality to a machine operator during print runs. The offset printing paradigm provides highly skilled operators with control over the process of an offset printing press. For example, such operators are provided with the ability to adjust the pressure between printheads and take into account the length of print runs or the prevalence of one color toner over another during a print run by changing the amount of ink entering specific zones of a print sheet. In addition, the offset printing paradigm requires long print runs to insure that set-up costs are recovered. This sometimes leads to excess production which in turn requires storage until demand returns. In general, under the offset printing paradigm, print runs are required to be of sufficient length to amortize costs of image assembly and platemaking over the long runs. The xerographic printing paradigm, on the other hand, is directed at short print runs because copies are printed on demand. Consequently, print data is easily varied (e.g., compressed) to reduce storage requirements.

Xerographic digital printing machines typically provide operators with the ability to adjust print appearance before the start of a print run. For example, color adjustments allow operators to optimize print appearance of output copies. However, once print appearance selections are made, they are applied to an entire print job before the print job is rendered to a binary representation for printing. Adjustments are typically made to print appearance when a raster is decomposed from a contone (continuous tone) image. A contone image is defined herein as a multilevel image that approximates a continuous tone image, and a raster image is defined herein as a binary image that represented by a plurality of printer dots. The 5775 Digital Color Copier, produced by the Xerox® Corporation, offers extensive control to an operator to optimize print appearance. Specifically, the 5775 offers control over copy output lightness and darkness, sharpness, contrast, and different document types. Lightness and darkness adjustments, for example, vary hue along a scale from black to white. In addition, operators can adjust the balance between colors and the overall amount of color on output copies. More specifically, an operator is able to adjust the amounts of the three process colors, Cyan, Magenta, and Yellow, (CMY) to shift color balance on copies to a preference.

Color printing systems such as the 5775 Digital Color Copier, however, do not provide real-time print appearance control. Real-time print appearance control is defined herein as dynamic control of print appearance while a copier is producing prints. Generally, real-time print appearance control is outside operator control since appearance control is invariant and maintained by embedded control systems. Existing print appearance control systems are static or unchanged while a print job or copy job is imaged on a photoreceptor. However, greater control by an operator of a printing system is desirable because print appearance is often subjective. It would therefore be desirable to provide an operator of a digital printing system with the ability to vary print appearance in real-time or during a print run. It would also be desirable that a user input device provide operator control near a printer output tray to insure real-time feedback of print output to the user during a copy or print run, or when proofing a job.

In accordance with the present invention there is provided, in a digital printing system with a controller for converging operating characteristics of a first process control module on a first operating point stored in a memory, an apparatus for adjusting print appearance of printer output in real-time, comprising: a process control sensor for providing feedback from adjustments made to the first process control module, said process control sensor providing an output signal; an input device for incrementally adjusting the first operating point, said input device overriding the first operating point with a second operating point; a comparator for determining a difference value between the output signal from said process control sensor and the second operating point, said controller adjusting the first process control module in accordance with the difference value determined by said comparator; an interaction look up table being stored in the memory; and means for adjusting a third operating point of a second control module, said adjusting means overriding the third operating point with a fourth operating point, so that adjustments made to the second process control module compensate for the adjustments made to the first process control module.

In accordance with another aspect of the present invention, there is provided an apparatus for providing real-time print appearance control to an operator of a digital printing system, comprising: a contone image; an image processing system for decomposing said contone image to a raster image in accordance with a set of image processing parameters; an input device connected to said digital printing system, said input device providing input signals to modify the set image processing parameters; and a controller for detecting input signals from said input device while the print request is printed by the digital printing machine, said controller invoking said image processing system to decompose the contone image in accordance with a modified set of image processing parameters to change the print appearance of the output of the digital printing machine.

One aspect of the invention is based on the recognition of a problem with conventional xerographic printing systems—they do not provide real-time print appearance control. This aspect is further based on the discovery that this problem can be solved by the addition of a user interface apparatus (e.g., a joystick) for the output appearance control. The apparatus described is advantageous because it adds operator flexibility to color printing processes similar to that found on lithographic presses. As a result of the invention, short-term xerographic process controls are overridden by joystick commands.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
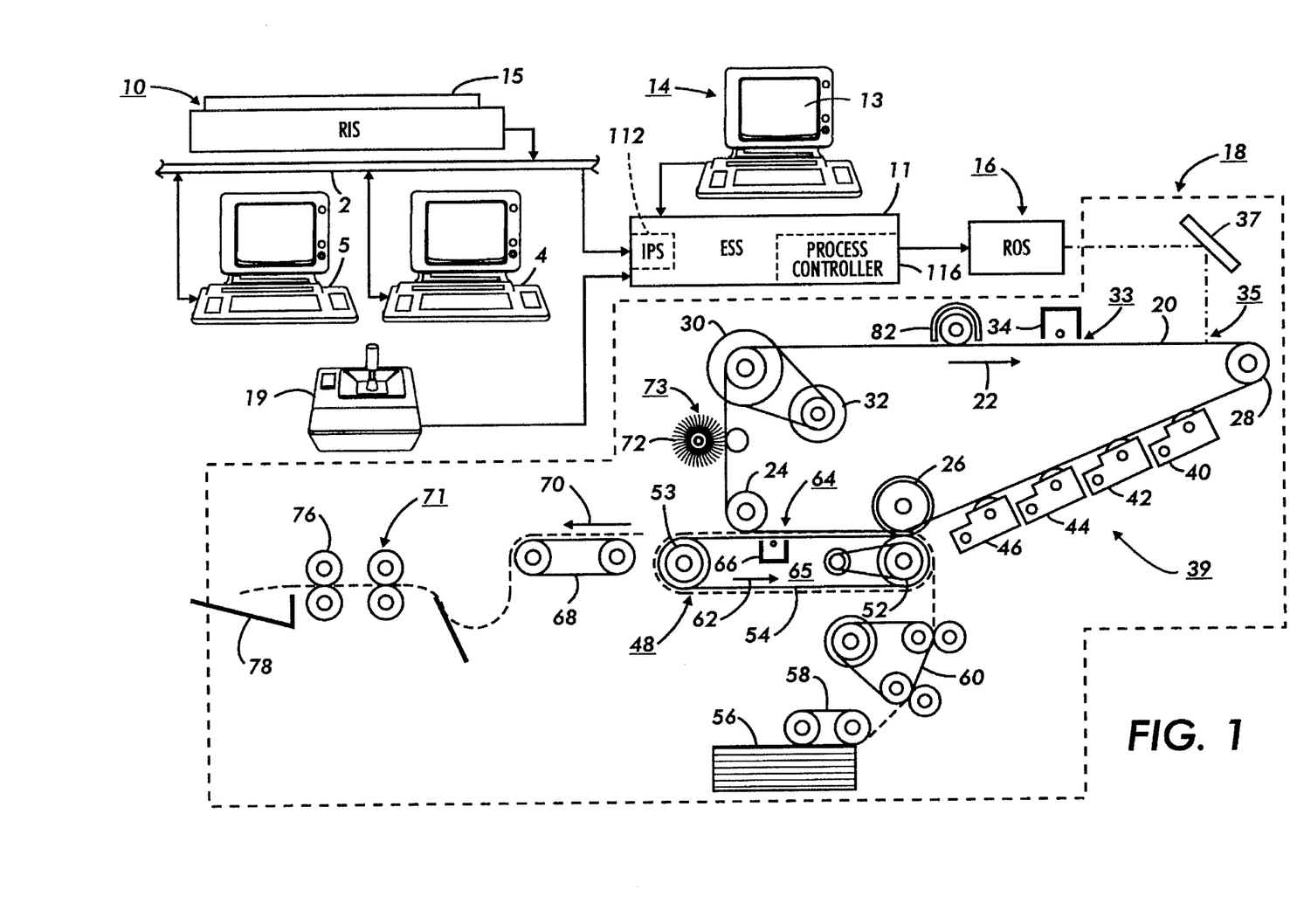
FIG. 1 is a schematic elevational view depicting an illustrative color electrophotographic printing machine incorporating the present invention.

Referring initially to FIG. 1 where there is shown a color electrophotographic printing machine incorporating the present invention. It will become evident from the following discussion that the system of the present invention is equally Well suited for use in a wide variety of printing and copying systems, and therefore is not limited in application to the particular system(s) shown and described herein.

To begin by way of general explanation, FIG. 1 is a schematic elevational view showing a color multi-pass electrophotographic printing machine incorporating features of the present invention. A control section, indicated generally by the reference numeral 11, is known as an electronic subsystem (ESS). ESS 11 includes an image processing station (IPS) 112 and a process controller 116 which contains data processing and control electronics to prepare and manage flow of image data to a raster output scanner (ROS), indicated generally by the reference numeral 16. A user interface (UI) 14 and a joystick 19 are in communication with ESS 11. In addition, a network 2 of one or more workstations 4 or print servers 5 also interface and communicate with ESS 11.

UI 14 enables an operator to control and monitor various operator adjustable functions and maintenance activities. The operator actuates the appropriate keys on UI 14 to adjust the parameters of a print job. UI 14 may be a touch screen, or any other suitable control panel, providing an operator interface with the system. The output signal from UI 14 is transmitted to ESS 11. ESS 11 is a programmable microprocessor system, as exemplified by U.S. Pat. No. 4,475,156 and its references which are hereby incorporated by reference. ESS 11 conventionally controls all machine steps and functions described herein, and others, including the operation of document feeders, document and print sheet deflectors or gates, sheet feeder drives, downstream finishing devices, etc. Conventional path sensors or switches may be utilized to help keep track of the position of the documents and the print sheets and the moving components of printer 18 by connection to the ESS 11.

As further shown in FIG. 1, a multiple color document 15 may be positioned on a raster input scanner (RIS), indicated generally by the reference numeral 10. The RIS 10 may be directly connected to ESS 11 or indirectly through network 2. The RIS contains document illumination lamps, optics, a mechanical scanning drive, and a charge coupled device (CCD array) or full width color scanning array. RIS 10 captures the entire image from document 15 and converts it to a series of raster scan lines and moreover measures a set of primary color densities, i.e., red, green and blue (RGB) densities, at each point of the document. RIS 10 may provide data on the scanned image to IPS 112, which may be displayed at UI 14 on a display screen 13. Additionally, IPS 112 may receive digital or electronic images from a networked workstation 4 or print server or raster input processor 5. Documents transmitted from workstation 4 to ESS 11 are electronically generated or retrieved from any number of devices including computer tape, CD ROM, floppy disks, etc.

IPS 112, which is discussed in detail below, receives a contone image and decomposes the contone image to a raster image. IPS 112 transmits signals corresponding to the desired electronic or scanned image to ROS 16 to create the output print image. ROS 16 preferably includes a laser which may be a solid state device with a rotating polygon mirror. The ROS 16 illuminates, via mirror 37, the charged portion of a photoconductive belt 20 of printer 18 at a rate of about 400 pixels per inch to achieve a set of subtractive primary latent images. The ROS 16 will expose the photoconductive belt 20 to record three or four latent images which correspond to the signals transmitted from IPS 112. One latent image is developed with cyan developer material. Another latent image is developed with magenta developer material and the third latent image is developed with yellow developer material. A black latent image may be developed in lieu of, or in addition to, other (colored) latent images. These developed images are transferred to a print sheet in superimposed registration with one another to form a multicolored image on the print sheet. This multicolored image is then fused to the print sheet forming a color print.

With continued reference to FIG. 1, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential. Next, the charged photoconductive surface is rotated to an exposure station, indicated generally by the reference numeral 35. Exposure station 35 receives a modulated light beam corresponding to information derived by RIS 10 having multicolored document 15 positioned thereat. The modulated light beam impinges on the surface of photoconductive belt 20. The beam illuminates the charged portion of the photoconductive belt to form an electrostatic latent image. The photoconductive belt is exposed three or more times to record three or more latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44, and 46. The developer units are of a type generally referred to in the art as "magnetic development subsystems." Typically, a magnetic donor development system employs a magnetizable developer material including magnetic carrier granules having toner particles adhering triboelectrically thereto. The developer material is continually brought through a directional flux field to form a donor of developer material. The developer material is constantly moving so as to continually provide the donor with fresh developer material. Development is achieved by bringing the donor of developer material in sufficiently close vicinity of the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white document. Each of the developer units is moved into and out of an operative position. In the operative position, the magnetic donor is substantially adjacent the photoconductive belt, while in the nonoperative position, the magnetic donor is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 52 and 53. A sheet gripper (not shown) extends between belts 54 and moves in unison therewith. A sheet is advanced from a stack of sheets 56 disposed on a tray. A friction retard feeder 58 advances the uppermost sheet from stack 56 onto a pre-transfer transport 60. Transport 60 advances the sheet to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (not shown) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

A sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to an output tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 2:
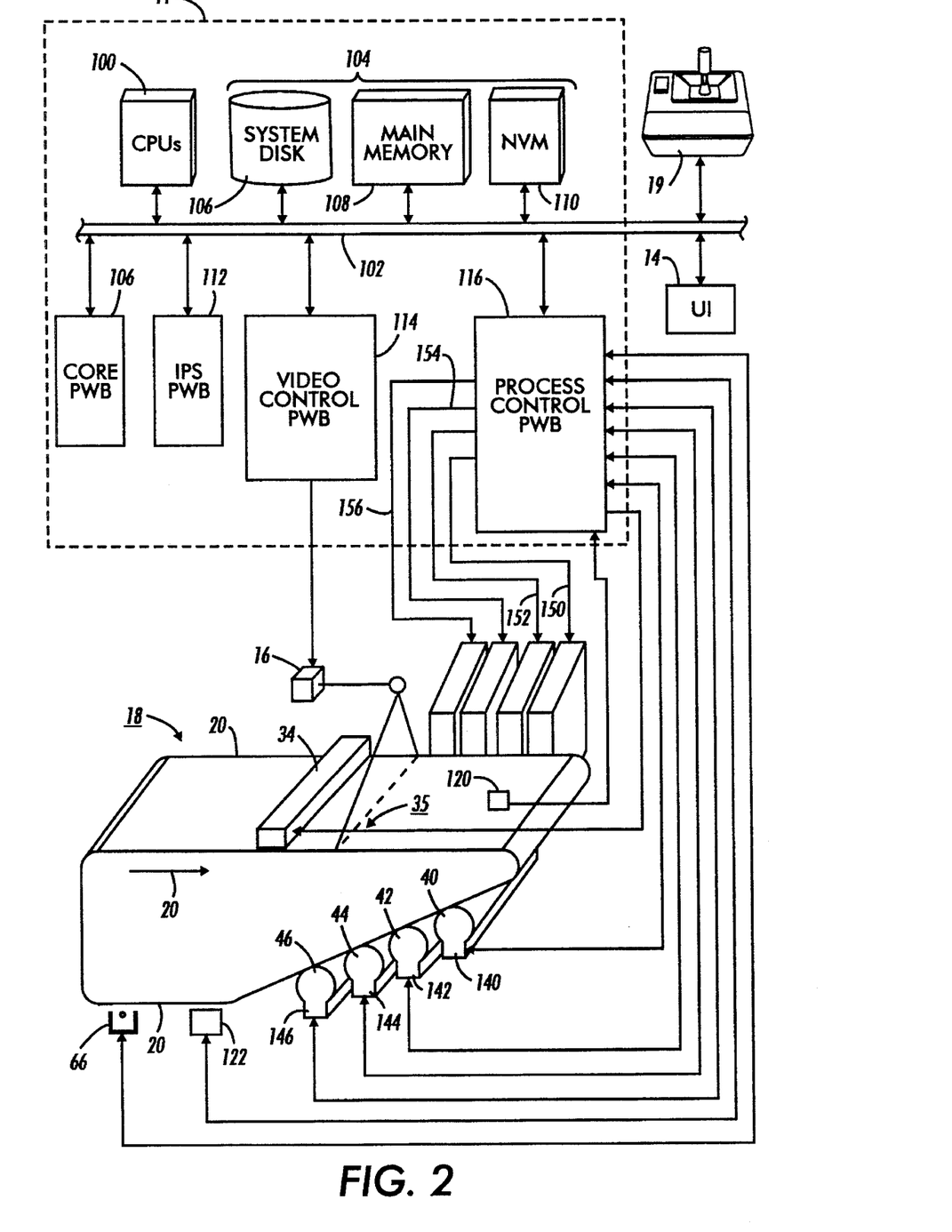
FIG. 2 is a block diagram depicting the interconnection among active components of the printer shown in FIG. 1.

FIG. 2 depicts the interconnection among active components of printer 18 and electrostatic and developability control systems in ESS 11. The control systems which regulate the operation of printer 18 include a plurality of central processing units 100 that execute operating software stored in memory 104. The control systems which are resident on a plurality of printed wire boards (PWBs) communicate over shared line 102. Memory 104 includes system disk 106, main memory 108, and non-volatile memory (NVM) 110. Operating software which is resident in main memory 108 includes applications software for implementing and coordinating operations of machine components. Each PWB performs one or more particular machine function. Specifically, ESS 11 includes IPS PWB 112, video control PWB 114, process control PWB 116, and core PWB 106 which performs a plurality of functions for operating and controlling printer 18 that include user interface control, joystick control, paper handling control, and various input/output control.

Commands from UI 14 or joystick 19 direct ESS 11 in reproducing electronic images on printer 18 in accordance with specified characteristics. Initially, an image received in electronic form from a workstation 5 or from a raster input scanner 10 is processed by IPS 112 and stored on system disk 104. The image processing system 112 which is resident on a PWB performs corrections and changes on a pixel by pixel basis before sending an image to ROS 16 driven by video control PWB 114. The image processing system 112, for example, performs under color removal which recognizes that black toner can be substituted for a portion of cyan, magenta, and yellow toner. Under color removal is a technique for reducing the amount of magenta, yellow, and cyan in neutral areas and replacing them with an appropriate amount of black. In addition, image processing system 112 adjusts gamma characteristics of the printer 18. The gamma characteristics are adjusted using a plurality of tone reproduction curves or TRCs. A TRC is a function in image processing that adjusts the characteristic of output image density to input image density. Each color (cyan, magenta, yellow, and black) is represented by a unique tone reproduction curve (TRC) that can be individually modified. An operator is able to vary color output by adjusting the TRC for each color at UI 14 before submitting a print job to printer 18. In addition, screen angles can be varied by the IPS 112. Screen angles are used to offset different films in process color separations. Adjusting/randomizing a proper screen angle and periodicity is critical to minimizing moiré patterns.

Process controls which are resident on PWB 116 consist of electrostatic controls and developability controls. These controls are sensitive to use and to environmental changes. Process controls on PWB 116 attempt to stabilize print quality over time. In the long term, print quality is stabilized by a sensing device such as a densitometer (not shown) that measures colorimetric parameters such as L*, a* and b* parameters using printed patches at several locations of a print sheet. The control system in memory 108 corrects long term color shifts that may create variations in print appearance between machines.

Short term print quality stability, on the other hand, is maintained with electrostatic controls. Specifically, short term electrostatic controls include an electrostatic voltmeter (ESV) 120 to measure photoreceptor voltage levels. The developability controls include an optical control patch density sensor 122 to measure the developed toner mass on photoreceptor 20, and four toner concentration sensors 140, 142, 144, and 146, one for each color, to measure toner concentration in each developer housing, 40, 42, 44, and 46 respectively. Control logic processes the output from the six sensors 120, 122, 140, 142, 144 and 146, to make adjustments to xerographic control parameters. These parameters include exposure level, developer roll bias, transfer current, and charge potential. Machine operating parameters that are stored permanently in NVM 110 represent optimum control settings or setpoints in order that the machine experience consistent performance. Typically, these operating parameters provide an operating range or window in which printing machine 18 runs. Outside the operating range the print engine 18 will run in a degraded mode before a complete shutdown.

At discrete times during the operating cycles of machine 18, operating software resident in memory 108 reads output from sensors such as ESV sensor 120, optical control patch density sensor (PD) 122, and concentration sensors 140, 142, 144, and 146. Setpoints at which the xerographic process are tuned are stored in NVM 110 and constantly adjusted after initial setup to within specified ranges to insure proper print quality, as disclosed in U.S. Pat. Nos. 5,006,892 and 5,285,241 the pertinent portions of which are hereby incorporated by reference. In general, digital values corresponding to analog measurements are processed in conjunction with the setpoints stored in NVM 110. At process control PWB 116, analog values arrive and are converted by a digital to analog converter resident therein. Output from process control PWB 11 controls the intensity of ROS 16, voltage control of corona generating device 34, toner dispenser motor controls 150, 152, 154, and 156, transfer current of corona generating device 66, and bias controls of developers 40, 42, 44, and 46.

Figure 3:
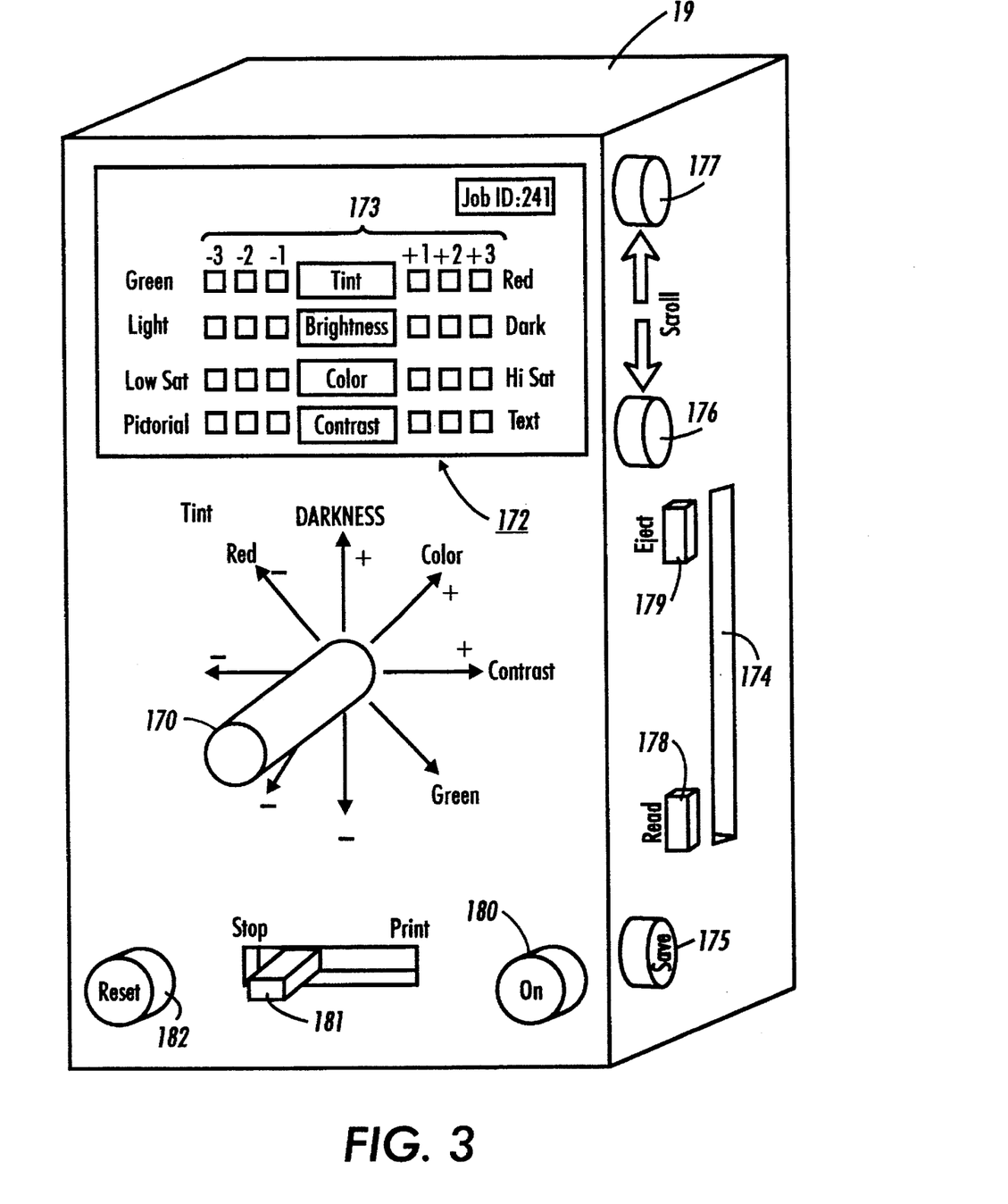
FIG. 3 is a plan view of a joystick incorporating the present invention.

In accordance with the present invention, joystick 19, which is shown in detail in FIG. 3, provides real-time print appearance control to an operator of printer 18. Joystick 19 varies print appearance parameters in limited and repeatable steps. Joystick 19 includes a stick 170 for selecting a plurality of print appearance characteristics. Feedback of selected characteristics are shown on panel 172 of joystick 19. The print appearance parameters adjustable by joystick 19 include color, contrast, lightness/darkness, and tint. Threshold step adjustments made to each print appearance control parameter are displayed on panel 172 using arrays of light emitting diodes (LEDs), indicated generally by the reference numeral 173. Each LED represents an incremental change in a particular print appearance parameter. The multi-directional joystick 19 can alternatively be substituted with a similar input accessory such as a plurality of single directional toggles, a roller ball or a touch screen. In addition, alternate or additional appearance parameters can be adjusted using the input device. The joystick 19 or a similar input device is positioned near output tray 78 (shown in FIG. 1) for real-time print appearance verification of print output by the joystick operator.

Joystick 19 is intuitive to use, the center position of stick 170 is initially set at a nominal position. The nominal position setting is a position at which process controller 119 maintains consistent image quality by reference to certain control setpoints stored in NVM 110. Changes made to NVM control points can be stored on a disk or similar magnetic media using media drive 174. The panel 172 provides job identification (JobID) information that enables an operator to identify a currently copy or print job for retrieval or storage of previously modified print control parameters. To store modified print control parameters of a print job, an operator selects "save" button 175. To retrieve print control parameters of a print job that were previously stored on a tape (not shown), an operator scrolls through stored JobIDs using buttons 176 and 177. Once a JobID is identified, the "read" button 178 is selected on joystick 19 to retrieve previously stored print control parameters. The tape containing the stored control parameter information is then removed from joystick 19 using "eject" button 179.

Operationally, control of printer 18 is resident at either joystick 19 or UI 14. Control is transferred to joystick 19 from UI 14 when switch 180 is in the "on" position. Print copies are produced by print-engine 18 for a current print job when switch 181 is set to the "print" position. The operator can terminate printing at any time by setting switch 181 to the "stop" position. In addition, "reset" switch 182 provides the operator with the ability to reset any modified print appearance control parameters to nominal values provided at the start of a print job. Thus, in the case that print appearance control parameters have been modified and print output is undesirable, an operator is able to undo any changes made to control points stored in NVM 110 by either turning off joystick 19 with switch 180 or resetting the control point settings with switch 182, thereby directing process control 119 to continue maintaining control over print appearance.

Figure 4:
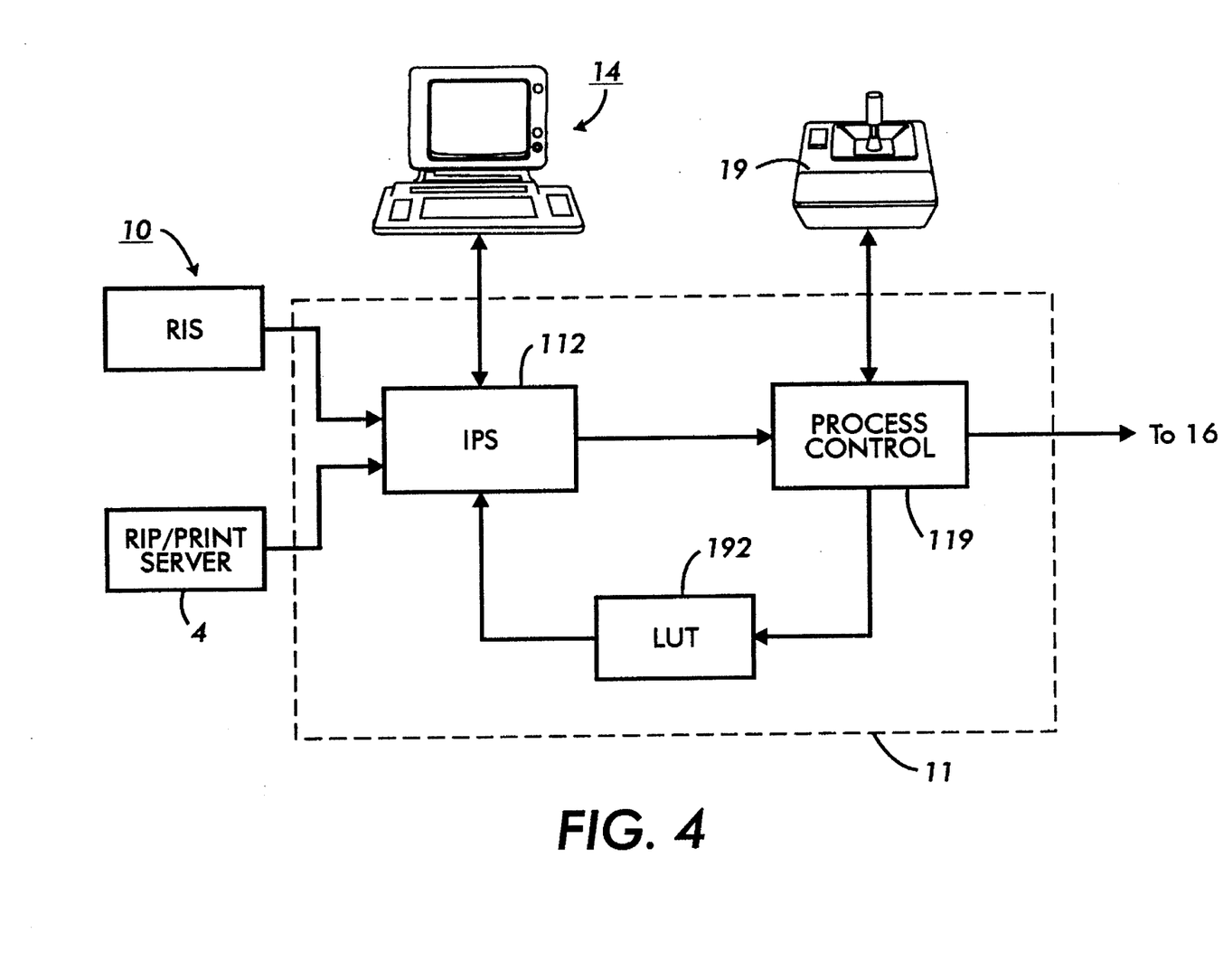
FIG. 4 is a block diagram depicting a first embodiment of the interconnection of the joystick and printing machine components shown in FIG. 3.

FIG. 4 is a block diagram depicting the connection of joystick 19 with ESS 11. The joystick is physically connected through a portable service workstation port (not shown) that is generally accessible to a trained operator or technician. Once enabled at UI 14, joystick 19 invokes control software in memory 108 shown in FIG. 2. The control software overrides short term process controls while leaving long term controls unchanged. The print-engine effectively runs in a "diagnostic mode" setting as long as the joystick is active. In a first embodiment, joystick 19 control adjusts process control settings used by controller 116 to adjust print appearance of printer 16 print output. Initially, before control is given to joystick 19, an operator programs a print job at UI 14. The job is first received by ESS 11, for example, from either RIS 10, or raster input processor (RIP)/print server 4. As discussed above, image processing system 112 renders a raster image from a contone image. A representation of the raster image is scanned onto photoreceptor 20 by ROS 16 the intensity of which is controlled by process controller 116.

The joystick 19, however, is not a substitute for print-engine process control 119, since the window of process control is held extremely tight for print engine 18. Consequently, when the print-engine process control parameters are properly converged, a change in a print appearance parameter at joystick 19 elicits an identical response as if the print engine process control were making a similar change. Once a change is made and saved at joystick 19 using switch 180, current process control information can alternatively be converted to corresponding image processing control information using lookup table (LUT) 192. Output from LUT 192 directs IPS 112 to generate a raster image representing modifications to process control parameters input through joystick 19. The process control parameters are subsequently stored on a removable media such as a tape at drive 174 of joystick 19. Subsequently, the raster image and process control parameters can be retrieved at a later time (temporal separation) and printed on printer 16 or, alternatively, printed on an equivalent printer (spatial separation).

Figure 5:
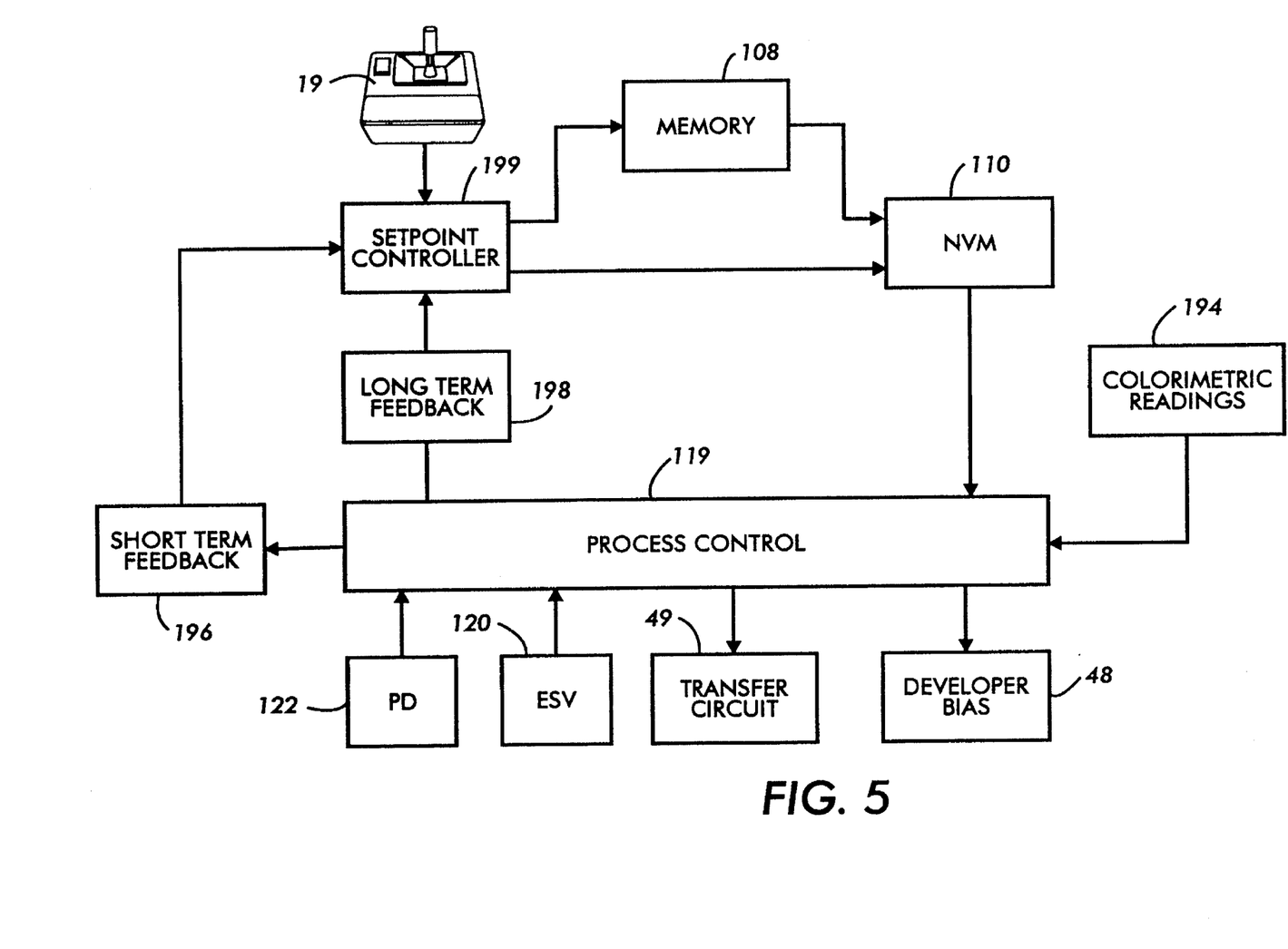
FIG. 5 is a detailed block diagram of the interconnections of the joystick shown in FIG. 3 with the printing machine components shown in FIG. 2.
Figure 6:
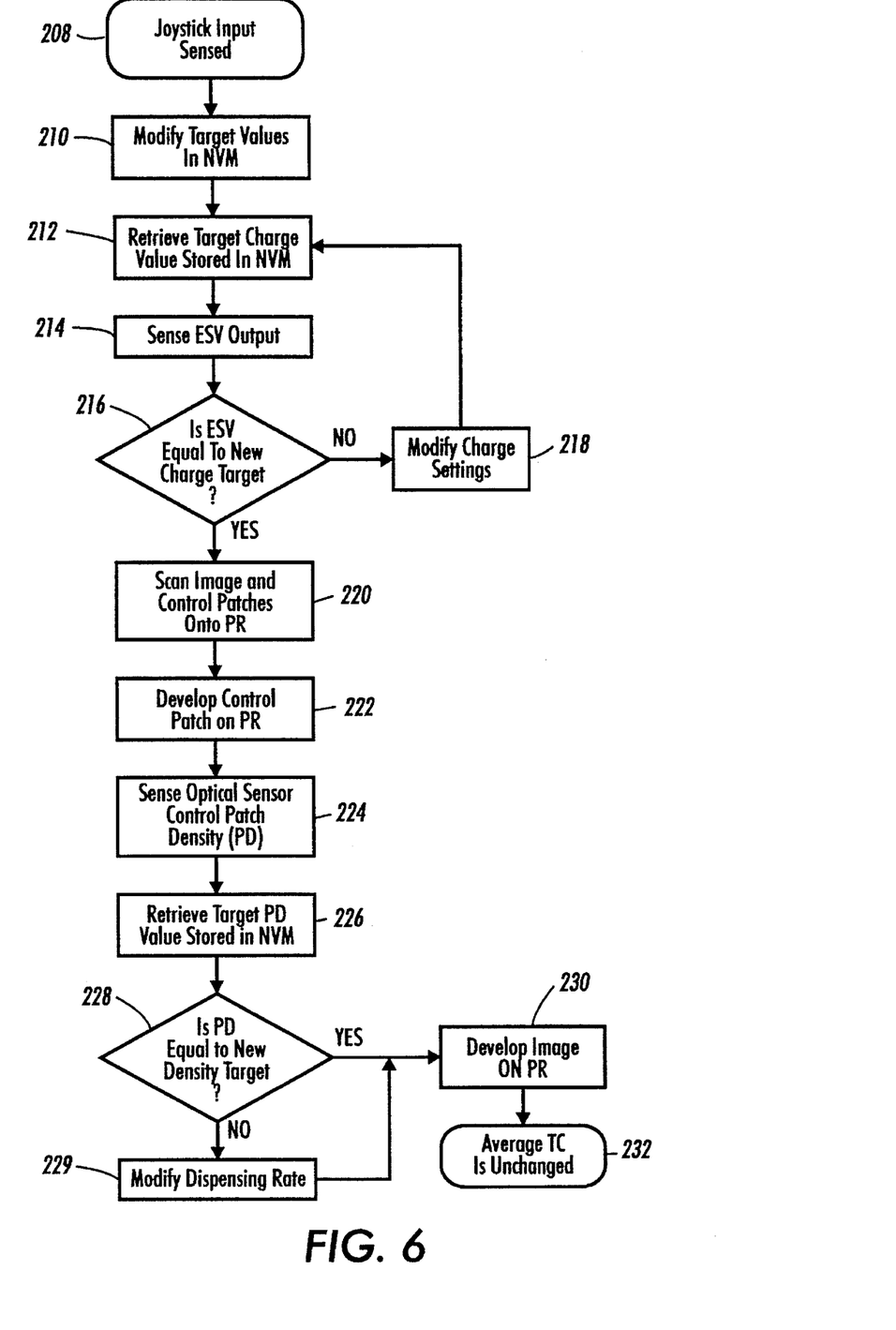
FIG. 6 is a flow diagram depicting the manner in which joystick commands affect process control parameters.

FIG. 5 depicts a block diagram of elements for modifying process control parameters with joystick 19 while imaging a print job on photoreceptor 20, and FIG. 6 is a flow chart representation of the modification of process control parameters shown in FIG. 5. Reading FIGS. 5 and 6 together, input from joystick 19 is sensed by process control system 116, at step 208. As discussed above, output from patch density (PD) sensor 122 and ESV sensor 120 are read at discrete times during the operating cycles of machine 18 by operating software resident in memory 108. Joystick 19 overrides convergence target values or setpoints of short term electrostatic controls such as PD 122 and ESV 120. Even though short term setpoints are overridden the short term electrostatic controls continue to function. When joystick 19 is not operating short term feedback is processed at 196 to determine whether a setpoint should be modified. Output from short term feedback controller 196 directs a setpoint to be modified at setpoint controller 199. Setpoint controller 197 adjusts setpoints stored in NVM 110 as discussed above.

With continued reference to FIGS. 5 and 6, when input is sensed at step 208, setpoint controller 199 is directed by joystick 19 to perform an incremental change (or offset) to nominal setpoints stored in NVM 110, at step 210. Electrostatic target values modified in NVM 110 at step 210 include modification of other "offset" process variables to insure toner concentration (TC) remains constant. For example, modification to a charge setting includes possible modification to toner dispensing rate. A value for an "offset" process variable is determined by reference of a setpoint change to an interaction lookup table stored in memory 108. Thus, at step 210 a plurality of setpoint target values are modified depending on whether "offset" process variables are required for a specified setpoint change at joystick 19.

At step 212, process controller 116 retrieves target charge values or setpoints stored in NVM, previously modified at step 210. ESV sensor 120 output is sensed at step 214 and processed at step 216 by process controller 116. If the ESV output is not equal to the new charge setpoint retrieved from NVM 110, process controller 116 modifies charge settings of developer bias 48 at step 218 and loops back to step 212. Alternatively, settings for other electrostatic subsystems such as transfer current 49 can be varied at step 218. If the ESV output is equal to the new charge setpoint retrieved from NVM 110, the process controller scans a raster image and control patches onto photoreceptor 20 at step 220. The control patches are then developed at step 222 and subsequently optical sensor control patch density (PD) 122 is sensed at step 224. At step 226, process controller 116 retrieves a target patch density stored in NVM 110, which may have been modified by interaction lookup table stored in memory 108. The target patch density retrieved from NVM is then evaluated against the sensed patch density at step 228 by process controller 116. If the target patch does not equal the sensed patch density, the toner dispensing rate is changed for a selected toner. Subsequently, the scanned raster image at step 220 is developed at step 230 such that the average toner concentration is unchanged at step 232.

During the sequence of steps enumerated in FIG. 6, long term process control continues to operate. Process controller 116 at periodic intervals performs colorimetric readings and adjusts corresponding long term process variables stored in NVM 110 as initiated by long term feedback controller 198 and directed by setpoint controller 199. As a general rule, 11000 prints define a short term interval and greater than 5000 prints defines a long term interval for printer 18. Long term period can alternatively be defined by the number of prints a printing system can produce in one hour. Generally, controls over electrostatics and toner concentration and triboelectric charge are sufficient to maintain stability of short term print quality. For longer term print quality stability, the colorimetric evaluations provide added control. Changes to the process control setting of printer 18 at joystick 19 are properly managed by process control 116 to maintain stability of original xerographic settings of the printer 18 using the interaction lookup table discussed above. Thus, printer stability is able to span a period of time so that xerographic setting can be stored on a tape on drive 174 for later use.

The description below applies to discharge-area development printing systems. In the case of charge-area development the controls on joystick 19 for contrast and brightness are interchanged. The joystick controls relate to process controls as follows: the photoreceptor charger is used to adjust contrast in light areas; the developer bias is used to adjust brightness in shadow areas; and the transfer current is used to adjust "color saturation" or chroma in all areas. The joystick 19 affects two electrostatic controls: developer bias and transfer current. The developer bias or cleaning field may have a nominal value of for example 70 volts with threshold steps of 6 volts each. The transfer current may have a nominal value of 150 micro amps with threshold steps of 12 micro amps. Tint is more complicated to implement. On multiple-transfer systems as disclosed above, transfer current control on individual colors can be used to adjust tint. It should be recognized by those skilled in the art that the tint of an image, which is measured in hue angle or the relative value of a* and b*, is directly related to the proportional mix of printed colors (either RGB or CMY). Tint can therefore be readily implemented using a lookup table.

Figure 7:
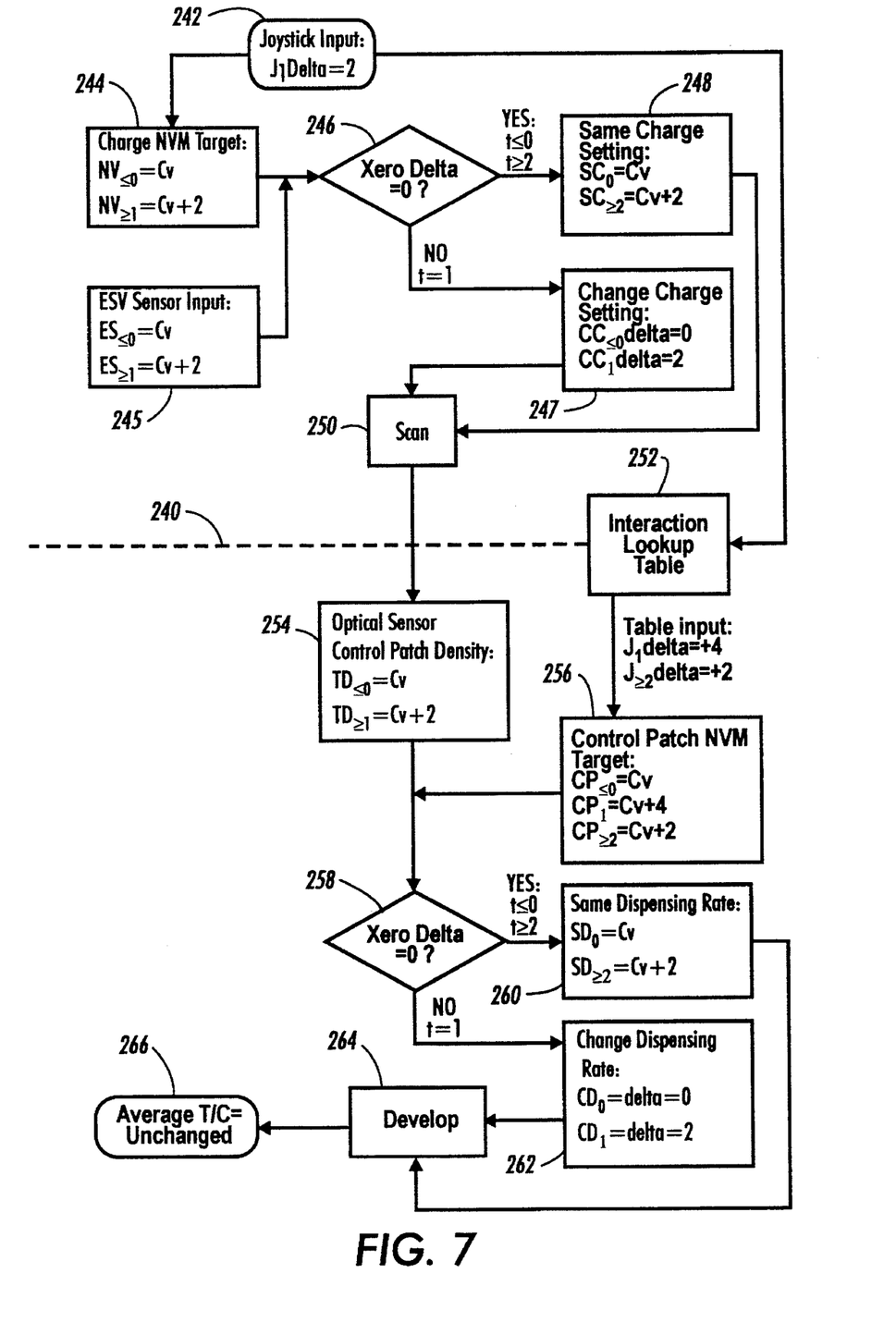
FIG. 7 is flow chart depicting a detailed example of the steps outlined in the flowchart shown in FIG. 6.

FIG. 7 is a detailed example flowchart of the general sequence of steps enumerated in FIG. 6. The example shows that signals input by joystick 19 do not set absolute values in NVM, rather the joystick 19 invokes commands to apply a delta shift from one or more convergence values (Cv) of the short term feedback control. Specifically, the example shown in FIG. 7 depicts an interaction of electrostatic charge and toner concentration. In the example, joystick input is determined to have a delta equal to two ($J_1$ delta=2). In order to keep printer 18 operating at its nominal settings, the dispensing rate must be adjusted to comply with each electrostatic change inputted by the joystick 19. Specifically, events occurring below dotted line 240 depict an interaction of the above electrostatic change on toner concentration. The optical sensor control patch density reads a darker image due to a darker print. At step 242, a response by print engine process-control elements is sensed at t=1. (In the example, subscripts designate control-loop cycles.)

The example illustrates a command sensed from joystick 19 for a darker image that corresponds to an incremental shift of an NVM setpoint value of "2". At step 244, the charge NVM target value is incremented by two. ESV sensor input, at step 245, is compared with the new charge target value at step 246 and charge output (i.e. developer bias) is immediately adjusted to compensate for the incremental shift of the NVM setpoint adjusted at step 244. Convergence to the new charge value should be instantaneous and not require dead cycling to converge the impact of the incremental shift, unlike the embedded control system which requires dead cycling when operating outside the printing system's window of operation. Dead cycling is a condition of the printer 18 in which one or more of the printer's drive motors are running and output prints are not being made while the embedded control system performs print appearance adjustments. Dead cycling should not occur when an incremental shift in an NVM setpoint is invoked by joystick 19 since the incremental shift should not move the nominal operating point at which the printing system is running outside its window of operation. Specifically in this example, at time interval t=1, a change charge value (CC) is incremented by a delta of "2" at step 247, otherwise at time intervals t≧2 the same charge value (SC) has not been changed at step 248.

When a command is given at joystick 19 for a darker print, the image charge density on the photoreceptor belt 20 is increased. Consequently, more deposited mass per unit area is required to neutralize or develop out a given area on the photoreceptor if the toner concentration is to remain the same. Toner concentration is an absolute weight measurement of toner divided by the total weight of the developer mix, which is inferred by density readings from sensors 140, 142, 144, and 146, or patch density sensor 122 (shown in FIG. 2). By way of analogy, toner concentration is similar to a mechanical paint brush which requires more fresh paint to the brush per unit time if the amount of paint deposited per unit time increases. Toner concentration, similar to triboelectric charge, is a parameter that affects print quality of fine line reproduction, clean backgrounds, and solid area darkness and uniformity. Alternatively, the cleaning field or developer bias may be changed instead of the image charge density. Similar results can be achieved but with slower response time by adjusting the triboelectric charge or the toner concentration, if the charge per area on the photoreceptor remains the same. Since toner concentration and triboelectric charge are sensitive steady-state attributes of a xerographic system their adjustment is outside operator control.

Referring again to FIG. 7, in response to the changed charge target, toner concentration process control is recalibrated to increase the toner dispensing rate of a selected toner as depicted by steps occurring below dotted line 240. A raster image and control patch is scanned onto photoreceptor 20 at step 250. A toner concentration recalibration value must be provided since the current patch density value stored in NVM is less than the density of the control patch detected at step 254. The embedded process control system would therefore want to reduce the dispensing rate to compensate for the difference between the two values, at a time when the dispensing rate should be increased. The toner concentration recalibration value which is provided by an interaction lookup table at step 252 replaces the previous toner concentration NVM target value. At time interval t=1, the NVM target value is initially incremented by more than the steady state target value to offset the affect of the increased charge at step 256. At time interval t≧2, the control patch target value is adjusted to its steady state value or perceived change value at step 256. At step 258, depending on the difference between the control patch detected at step 254 and the target value retrieved from NVM at 256, the dispensing rate remains constant at step 260 or is increased at step 262. The image and test patch are subsequently developed at step 264, such that the average toner concentration is unchanged at step 266. Thus, the range of short term variations is limited so as not to cause an impact on the long term xerographic stability of the system.

Figure 8:
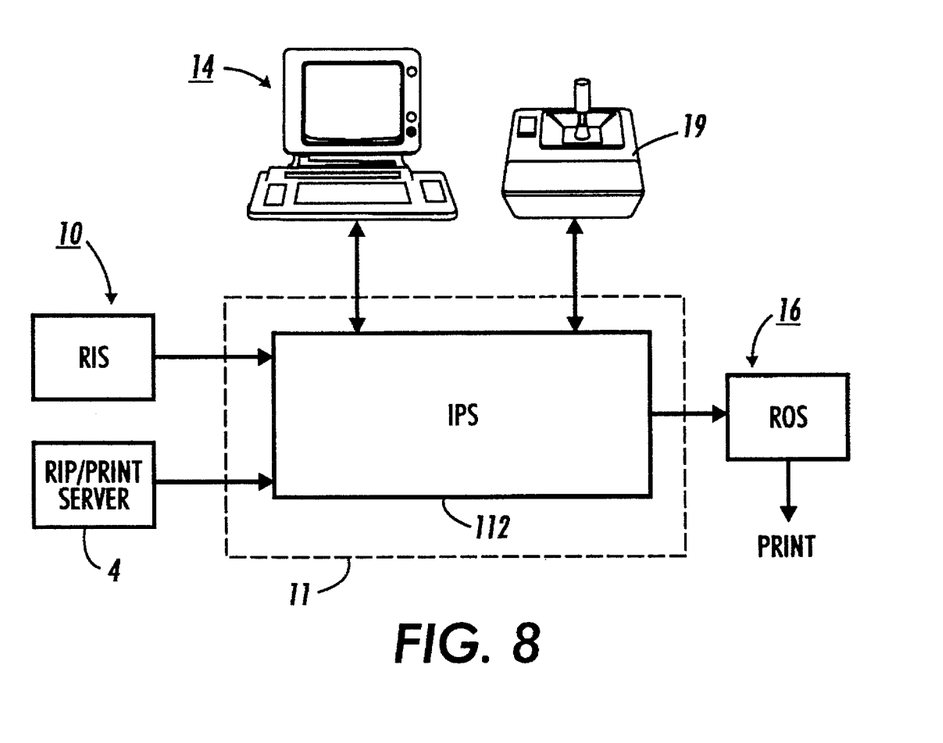
FIG. 8 is a block diagram depicting a second embodiment of the interconnection of the joystick shown in FIG. 3 and the printing machine components shown in FIG. 2.
Figure 9:
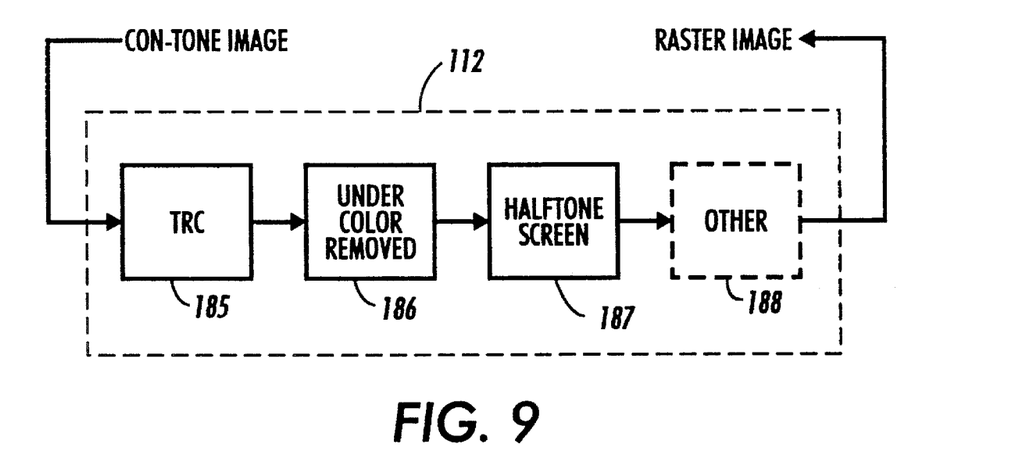
FIG. 9 is a detailed block diagram of the interconnections of the joystick shown and printing machine components shown in FIG. 8.

In an alternate embodiment, a block diagram of a printing system that provides real-time control of print appearance is shown in FIGS. 8 and 9. The printing system is similar to the printing system shown in FIG. 4 and described above. However, unlike the system shown in FIG. 4, connections of joystick 19 with ESS 11 are to IPS 112 and not process controller 116. In this embodiment, commands from joystick 19 adjust image processing parameters for a particular print request. ESS 11 consequently must re-rasterize the input contone image, using the modified control parameters, when a joystick command has been made. For example, a one page original document requiring 10 copies must be decomposed from a contone image to a raster image by IPS 112 for each of the 10 copies if an input from joystick 19 was sensed for each print.

As discussed above, the image processing system 112 has processors for performing TRC choice (from preloaded menu) at 185, undercolor removal at 186, screen angle variations at 187, and other image processing functions such as image enhancement, rotation or enlargement/reduction at 188. More specifically, input from joystick 19 changes the TRC target selected to another (via a lookup table), which provides the desired change in print appearance (in Tint, Brightness, Color, and/or Contrast). Once movement of stick 170 (shown in FIG. 3) is sensed by a joystick controller in ESS 11, an original contone image is processed again by each image processing station in IPS 112 to form an output raster image which is scanned onto photoreceptor 20 by ROS 16.

Figure 10:
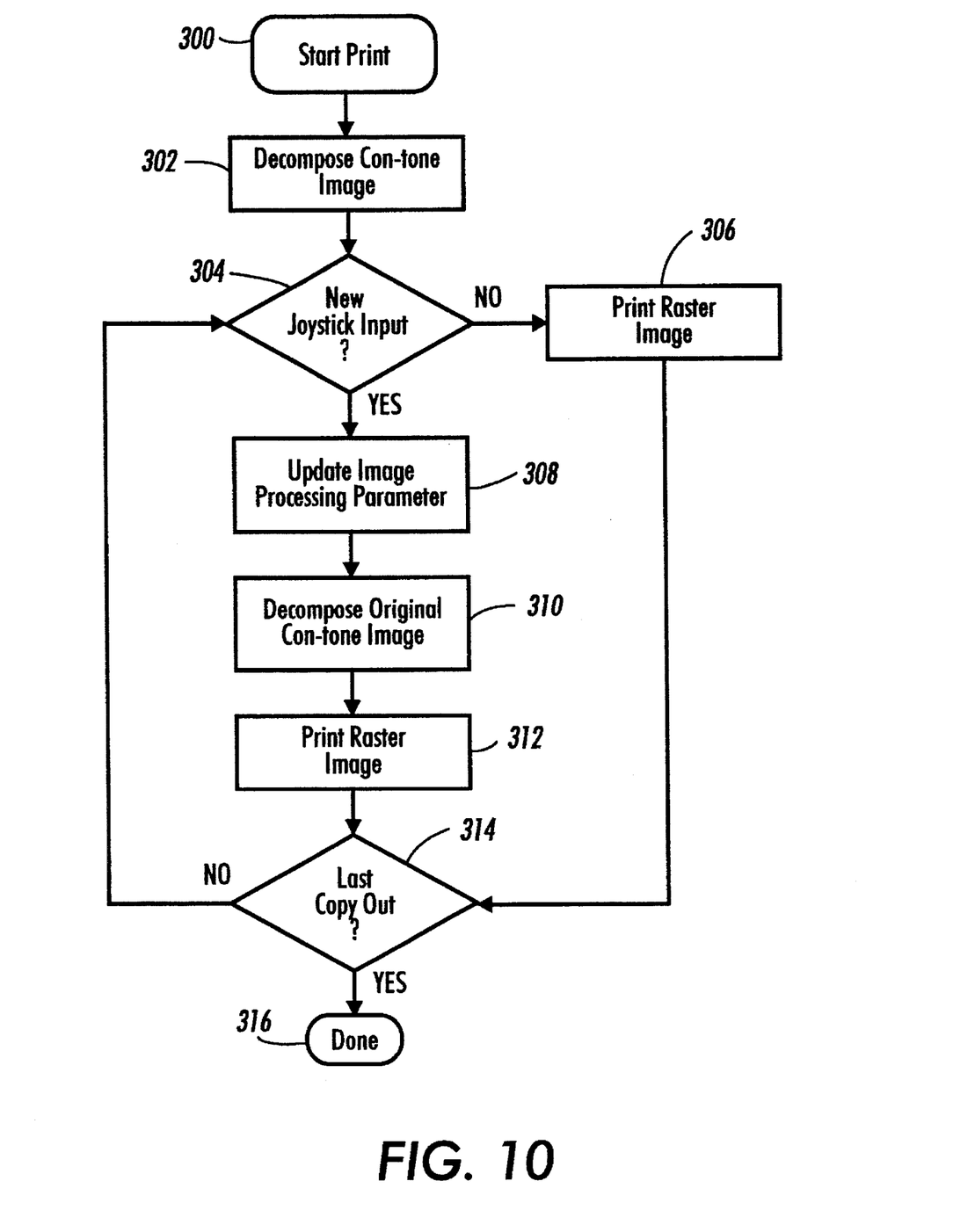
FIG. 10 is a flow diagram depicting the manner in which joystick commands affect the image processing control system.

FIG. 10 is a flow diagram of commands from joystick 19 that are processed by ESS 11 during a print request. Selection of "print" by an operator on switch 181 (shown in FIG. 3) of joystick 19 initiates a start print request at step 300. At step 302, IPS 112 decomposes an original contone image. At step 304, a determination is made as to whether new input from joystick 19 is sensed. If no new input is sensed, the current raster image is printed at step 306. If, however, new input from joystick 19 is sensed, a different TRC that corresponds to commands issued at joystick 19 is chosen, at step 308. At step 310, the original contone image is again decomposed, but with the newly chosen TRC. At step 312, a new raster image having new image processing parameters is printed. If the last print has been printed for a specified print request at step 314, the printer has completed processing a current print request at step 316. However, if at step 314, the last print has not been printed a determination is again made as to whether new input from joystick 19 is sensed at step 304.

In general, the operation of joystick in the embodiment shown in FIG. 8 is similar to the joystick shown in FIG. 3. Modified images can be saved and reprinted on demand by saving the identity of the chosen TRC, which provided the desired print appearance adjustment. The present invention is therefore well suited for proofing print requests before initiating long print runs. What is required by the invention is an input device that is readily accessible from a printer output tray so that real time adjustments to print appearance can be made. The present invention consequently not only provides real-time adjustments to print appearance while the printing system is operating, but in addition the proximity of the input device to an output station enables an operator to perceive output changes almost instantaneously. It will also be appreciated that a joystick is one of may input devices that can be used to implement the teachings of the present invention. Other input devices such as a roller ball, mouse and UI, keyboard etc. can be used in place of a joystick.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. In a digital printing system with a controller for converging operating characteristics of a first process control module on a first operating point stored in a memory, an apparatus for adjusting print appearance of printer output in real-time, comprising:

a process control sensor for providing feedback from adjustments made to the first process control module, said process control sensor providing an output signal;

an input device for incrementally adjusting the first operating point, said input device overriding the first operating point with a second operating point;

a comparator for determining a difference value between the output signal from said process control sensor and the second operating point, said controller adjusting the first process control module in accordance with the difference value determined by said comparator;

an interaction look up table being stored in the memory; and means for adjusting a third operating point of a second control module, said adjusting means overriding the third operating point with a fourth operating point, so that adjustments made to the second process control module compensate for the adjustments made to the first process control module.

2. An apparatus according to claim 1, wherein said memory is non-volatile memory.

3. An apparatus according to claim 1, wherein said input device adjusts a third operating point.

4. An apparatus according to claim 1, further comprising:

a corona device for charging a photoreceptor;

a raster input scanner for exposing the photoreceptor to a modulated laser beam: and a developer for applying a charged toner to the photoreceptor.

5. An apparatus according to claim 4, wherein said corona device is the first process module.

6. An apparatus according to claim 1, wherein the process control sensor provides short-term feedback.

7. An apparatus according to claim 1, wherein said input device is located near an output paper tray.

8. An apparatus according to claim 1, wherein said input device is a joystick.

9. An apparatus for providing real-time print appearance control to an operator of a digital printing system, comprising:

a contone image, said contone image including digital image signals to be rendered by the digital printing system;

an image processing system for decomposing said contone image to a raster image in accordance with a set of image processing parameters;

an input device connected to said digital printing system, said input device providing input signals to modify the set image processing parameters; and a controller for detecting input signals from said input device while the print request is printed by the digital printing machine, said controller invoking said image processing system to decompose the contone image in accordance with a modified set of image processing parameters to change the print appearance of the output of the digital printing machine.

10. An apparatus according to claim 9, further comprising a memory for storing image processing parameters of a print request.

11. The apparatus of claim 9, wherein the image processing system includes:
- a TRC processor for controlling the tonal reproduction curve of the print;
- an under color removal processor for controlling the amount of under color removal accomplished in rendering the print; and
- a halftone screen processor for applying a halftone screen to the contone image.

12. The apparatus of claim 11, wherein the modified set of image processing parameters includes parameters specifying a tonal reproduction curve, the amount of under color removal, and at least one halftone screen.

13. The apparatus of claim 12, wherein the modified set of image processing parameters further includes at least one image processing operation selected from the group consisting of:
- image enhancement;
- image rotation;
- image enlargement; and
- image reduction.

14. A digital printing system for producing an output print from a continuous tone image represented as a plurality of digital image signals, comprising:
- a user input device for providing real-time print appearance control to an operator of the digital printing system;
- an apparatus for adjusting the appearance of the print including
  - a process control module to control the operation of a xerographic component within the digital printing system,
  - a process control sensor for providing feedback from adjustments made to the process control module, the process control sensor providing an output signal,
  - means, responsive to the user input device and the process control sensor, for altering the operation of the process control module so as to effect a change in the appearance of the output print; and
- an image processing system, responsive to said user input device, for decomposing the contone image into a raster image in accordance with a set of image processing parameters, said image processing system altering the raster image in accordance with a modified set of image processing parameters, produced in response to the user input device, to change the print appearance of the output print.

15. The apparatus according to claim 14, wherein said user input device is located near an output paper tray.

16. The apparatus according to claim 15, wherein said user input device is a joystick.

* * * * *